J. H. KELLER.
PRUNING KNIFE.
APPLICATION FILED JUNE 18, 1913.
1,153,626.  Patented Sept. 14, 1915.
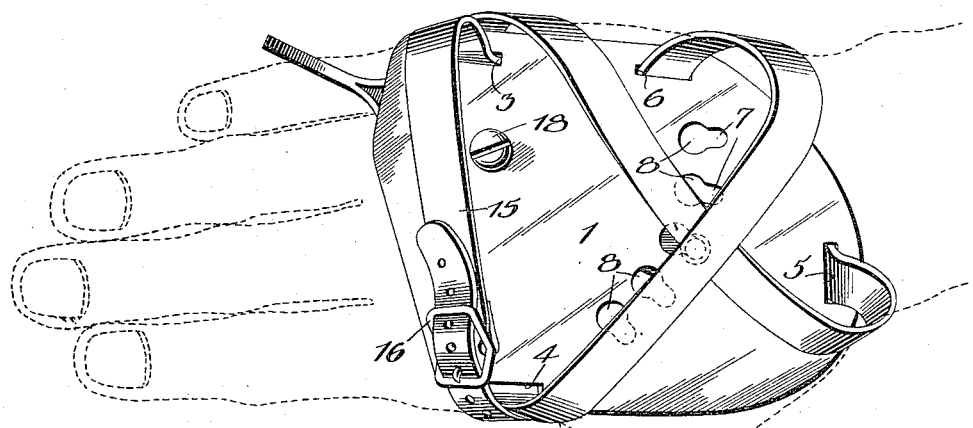
WITNESSES  INVENTOR
W. H. Rockwell  James H. Keller
May Barnes  George W. Sus. *Attorney*

UNITED STATES PATENT OFFICE.

JAMES H. KELLER, OF COVINGTON, OKLAHOMA.

PRUNING-KNIFE.

1,153,626. Specification of Letters Patent. Patented Sept. 14, 1915.

Application filed June 18, 1913. Serial No. 774,393.

*To all whom it may concern:*

Be it known that I, JAMES H. KELLER, a citizen of the United States, and a resident of Covington, in the county of Garfield and State of Oklahoma, have invented certain new and useful Improvements in Pruning-Knives, of which the following is a specification, reference being had to the accompanying drawings.

This invention has relation to certain new and useful improvements in pruning knives especially adapted to be used in heading maize or Kafir corn; and the object of my invention is to provide a device of this general character of a simple and inexpensive nature and of a compact and durable construction, which shall be capable of convenient and accurate adjustment in position upon either the right or left hand to enable the user to expeditiously remove the tops or extremities of the standing stalks.

With these and other objects in view, the present invention consists in the combination and arrangement of parts as will be hereinafter more fully described and finally pointed out in the appended claim, it being further understood that changes in the specific structure shown and described may be made within the scope of the claim, without departing from the spirit of the invention.

In the accompanying drawings forming a part of this specification and in which like numerals of reference indicate similar parts in the several views, Figure 1, shows a top view of a pruning knife embodying my invention showing a hand in dotted outline. Fig. 2, shows a perspective view of the knife and the reversible plate. Fig. 3, is a fragmentary sectional view disclosing the location of the set screw and securing stud. Fig. 4, shows a fragmentary view showing the stud within one of the access openings. Fig. 5, shows a fragmentary view disclosing one of the studs as seated within one of the radially disposed apertures.

In the cultivation of maize and Kafir corn it is found expedient to cut out the crown or tops of the stalks and in my present invention I provide a knife especially adapted to be used in heading maize and Kafir corn.

In carrying out the aim of my invention I employ an oblong round-cornered plate 1, in outline conforming to the palm of a human hand, having a screw opening 2 near one corner, squarely opposite the base of the operator's third finger as shown in Fig. 1. Radially disposed to the rear of the screw opening 2, are a plurality of apertures 7, which communicate with the adjacent access openings 8. As shown the apertures are spaced radially relative to the screw opening 2. These apertures 7, form seats, while the access openings 8 are of a size considerably larger than the apertures, as shown in the drawings. At four suitable points the plate 1, which is reversible, is provided with the strap openings or slots 3, 4, 5 and 6, located respectively opposite the little finger, the forefinger, and at opposite points within the wrist end of the plate as clearly shown in Figs. 1 and 2. In connection with this palm plate 1, I employ a knife embracing a flat bar 9, from which extends the recurved hook-shaped knife 10, having the knife edge 11, as shown. Near the base of the hook 10, the bar is provided with the threaded opening 17, shown in Figs. 2 and 3, while near the outer end, the bar is provided with the stud 13, having the enlarged head 14, as shown in Fig. 3. The stud 13 is of such a diameter that the same will snugly fit into the apertures 7, while the head 14 is of a size to readily pass through the access openings 8.

In securing the knife to the plate the operator inserts the stud 13 within one of the apertures 7, the head 14 preventing accidental displacement of the stud. When the stud is seated within an aperture, the opening 17 will register with the plate opening 2 so that a set screw 18 can be passed through the opening 2, and screwed into the opening 17 to removably secure the knife to the plate. As shown in Fig. 1 in its working position the knife hook 10 obliquely crosses below the third and little fingers of the hand to which the pruning knife is secured. The operator then again adjusts the knife to suit his convenience so that the same can be brought opposite the little, middle or third finger.

As some operators prefer to cut with the left hand, the plate is made reversible so that in this instance the plate would simply be reversed so that the hook would come on the side opposite to that shown in Fig. 1.

In order to securely hold the carrying plate to the palm of the operator's hand I employ a strap 15 which is first carried through the opening 3 then through the opening 5, from which the strap loops and passes through the opening 6, and finally passing through the opening 4, from which it is recurved to engage the buckle 16. In this way the strap crosses the back of the hand and also passing transversely across the palm of the hand, near the base of the fingers.

It is of course understood that these pruning knives may be made in various sizes. The device is further simple and inexpensive in construction and both durable and efficient in operation and can be adjusted to either the right or left hand with ease, accuracy and despatch.

I claim—

A pruning knife comprising a plate adapted to lie flat upon the palm of the operator's hand, a strap opening being located opposite the position of the operator's little finger and opposite the forefinger and at opposite points within the wrist end of the plate, a screw opening further being located at a point adjacent to said first mentioned strap opening and squarely opposite the position of the operator's third finger, of a flat bar ending at one end in a recurved hook knife a threaded opening being provided near the base of said knife, a stud having a head secured to the end of said bar opposite said hook knife, a strap crosswise secured within said strap openings, a screw within said screw opening and held within said threaded opening, said plate being provided with a plurality of apertures spaced radially relative to said screw opening each communicating with an access opening the head of said stud being adapted to pass through one of said access openings said stud being held within one of said apertures, whereby said bar is adjustably secured with its knife hook projecting beyond the edge of said plate, as and in the manner shown.

In testimony whereof I affix my signature, in the presence of two witnesses.

JAMES H. KELLER.

Witnesses:
F. D. BURNS,
H. E. WILMOT.

Copies of this patent may be obtained for five cents each, by addressing the "Commissioner of Patents, Washington, D. C."